(12) United States Patent
Glance

(10) Patent No.: US 6,520,582 B2
(45) Date of Patent: Feb. 18, 2003

(54) QUICK ADJUSTMENT RESTRAINT SAFETY SEAT LEAD SCREW SEAT BACK RECLINER

(76) Inventor: Patrick M. Glance, 14789 Keel St., Plymouth, MI (US) 48170

( * ) Notice: Subject to any disclaimer, the term of this patent is extended or adjusted under 35 U.S.C. 154(b) by 0 days.

(21) Appl. No.: 09/904,918

(22) Filed: Jul. 13, 2001

(65) Prior Publication Data

US 2002/0043857 A1 Apr. 18, 2002

Related U.S. Application Data

(60) Provisional application No. 60/217,933, filed on Jul. 13, 2000.

(51) Int. Cl.[7] .................................................. B60N 2/23
(52) U.S. Cl. ................................................ 297/362.14
(58) Field of Search ......................... 297/362.1, 362.12, 297/362.14

(56) References Cited

U.S. PATENT DOCUMENTS

| | | | |
|---|---|---|---|
| 4,394,047 A | 7/1983 | Brunelle | |
| 4,402,547 A | 9/1983 | Weston et al. | |
| 5,123,706 A | 6/1992 | Granzow et al. | |
| 5,246,271 A | 9/1993 | Boisset ................ | 297/362.13 |
| 5,280,999 A | 1/1994 | Jones et al. ............ | 297/362.14 |
| 5,306,073 A | 4/1994 | Rees ..................... | 297/362.14 |
| 5,318,341 A | 6/1994 | Griswold et al. | |
| 5,320,413 A | 6/1994 | Griswold et al. ...... | 297/362.14 |
| 5,597,205 A | 1/1997 | Glance et al. ......... | 297/362.14 |
| 5,865,506 A * | 2/1999 | Sakamoto ............. | 297/362.14 |
| 6,000,757 A * | 12/1999 | Sovis .................... | 297/362.11 |
| 6,030,043 A * | 2/2000 | Habedank ............. | 297/362.14 |

* cited by examiner

*Primary Examiner*—Peter R. Brown
(74) *Attorney, Agent, or Firm*—Waters & Morse, P.C.

(57) ABSTRACT

A quick adjustment mechanism for a seat back recliner operated by a lead screw, which is appropriate for use in a restraint safety seat, wherein the recliner comprises pivotally connected upper and lower body members connected respectively to back frame and seat frame portions of the seat. Seat inclination is controlled by a screw drive mechanism having axially spaced fixed and traveling pinions attached to the lower and upper body members. The recliner includes a quick adjustment mechanism wherein the fixed pinion is mounted in a multiple position quick adjustment slot in the body member. The slot desirably has a downwardly facing U-shaped configuration. A mounting pin on the fixed pinion fits in the U-shaped slot. Quick adjustment of inclination is achieved by moving the pin from one slot to the other without disengaging the screw drive.

8 Claims, 7 Drawing Sheets

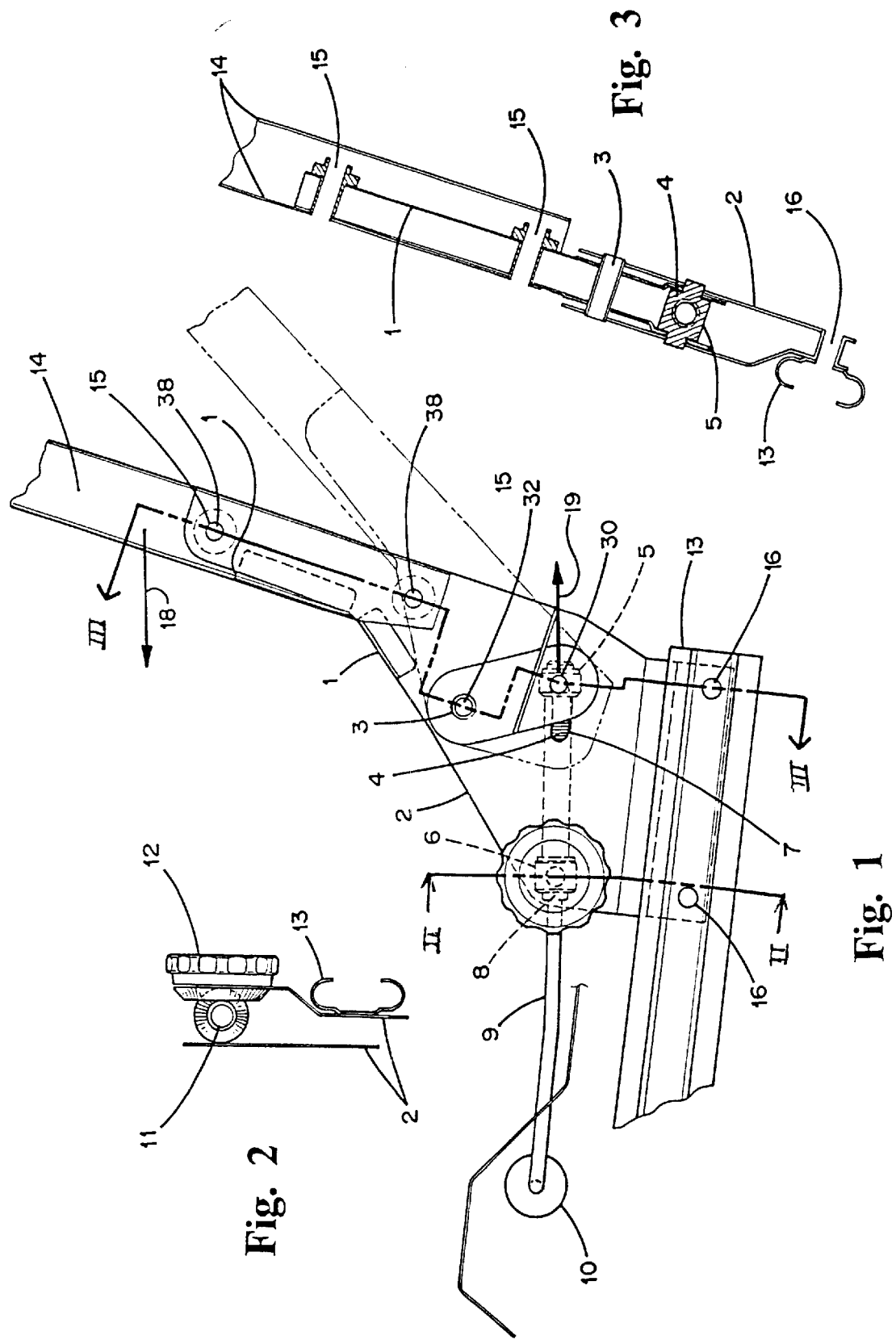

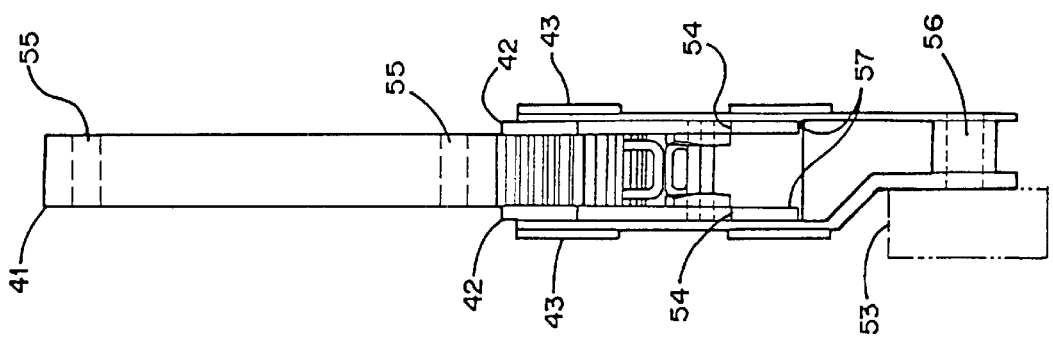
Fig. 6
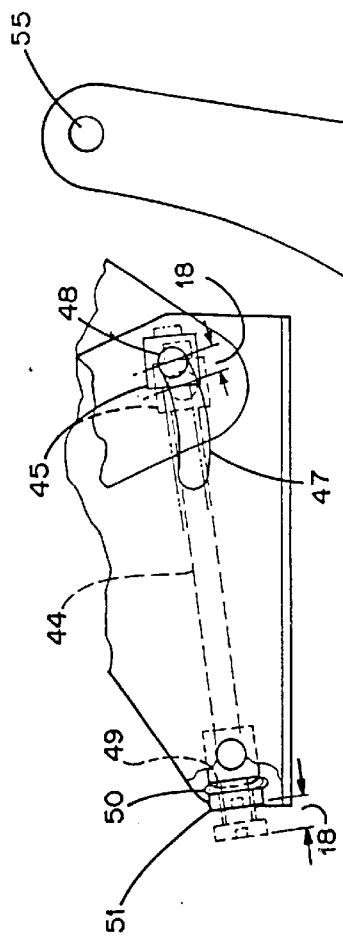
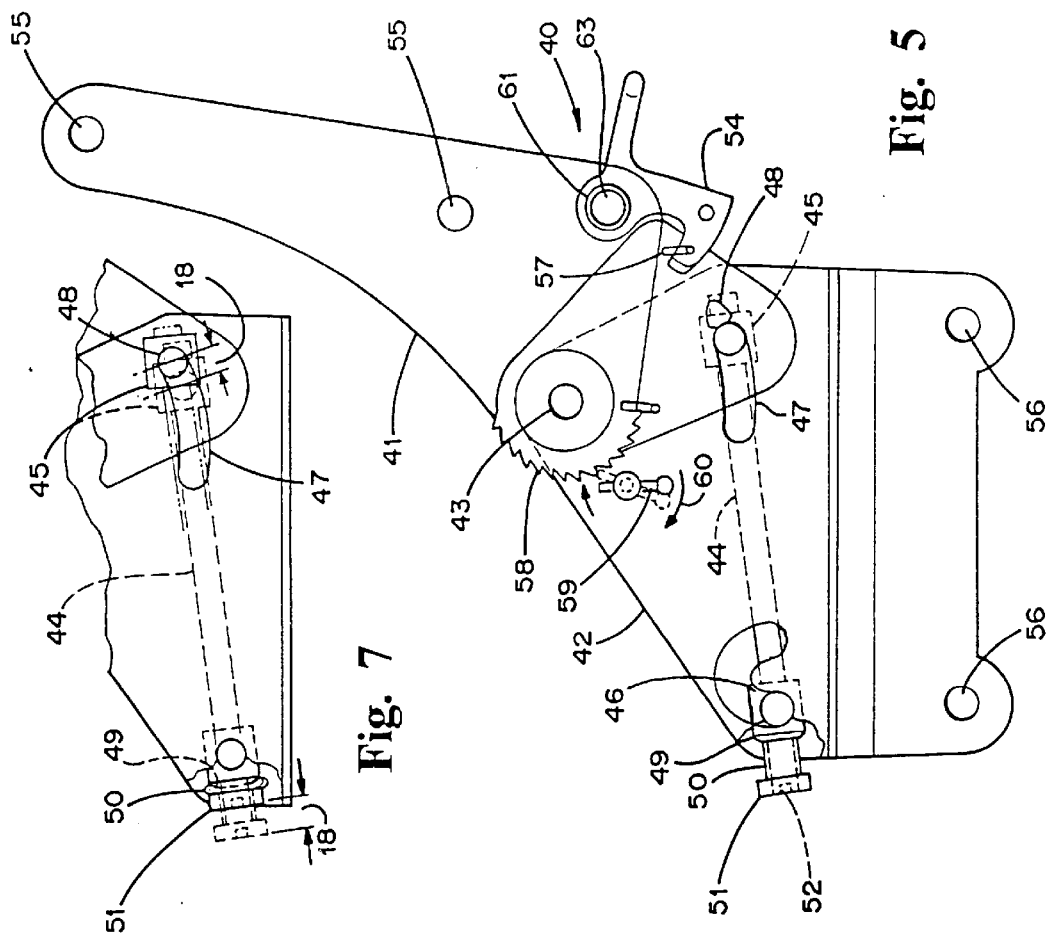
Fig. 7
Fig. 5

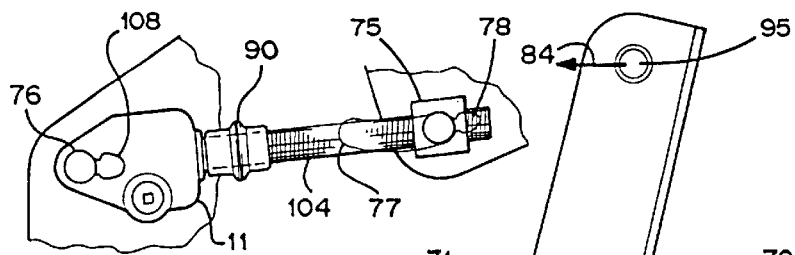
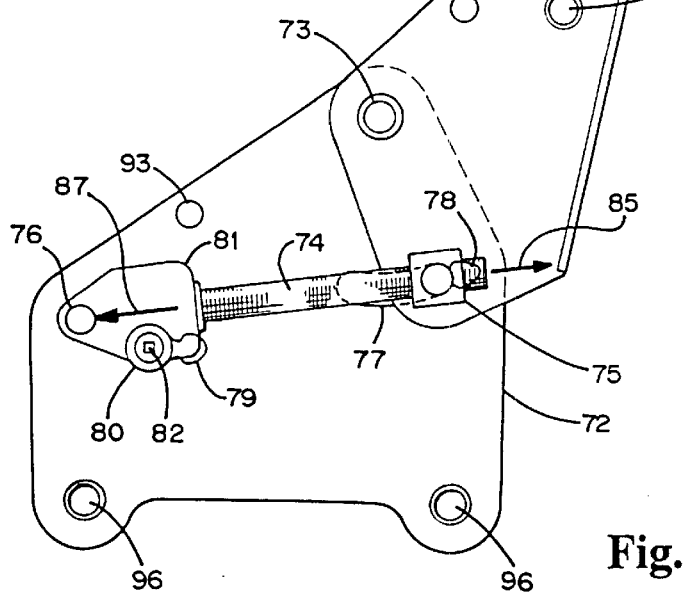
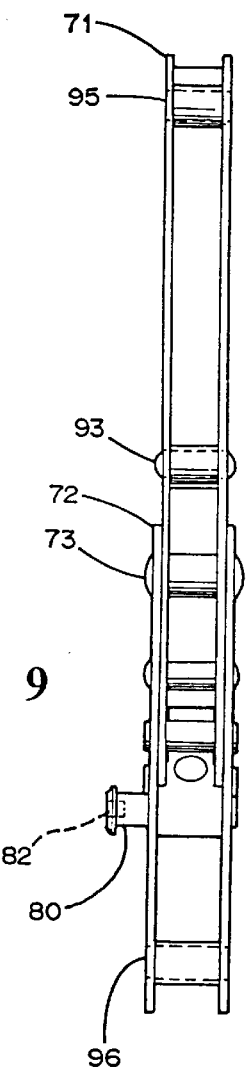

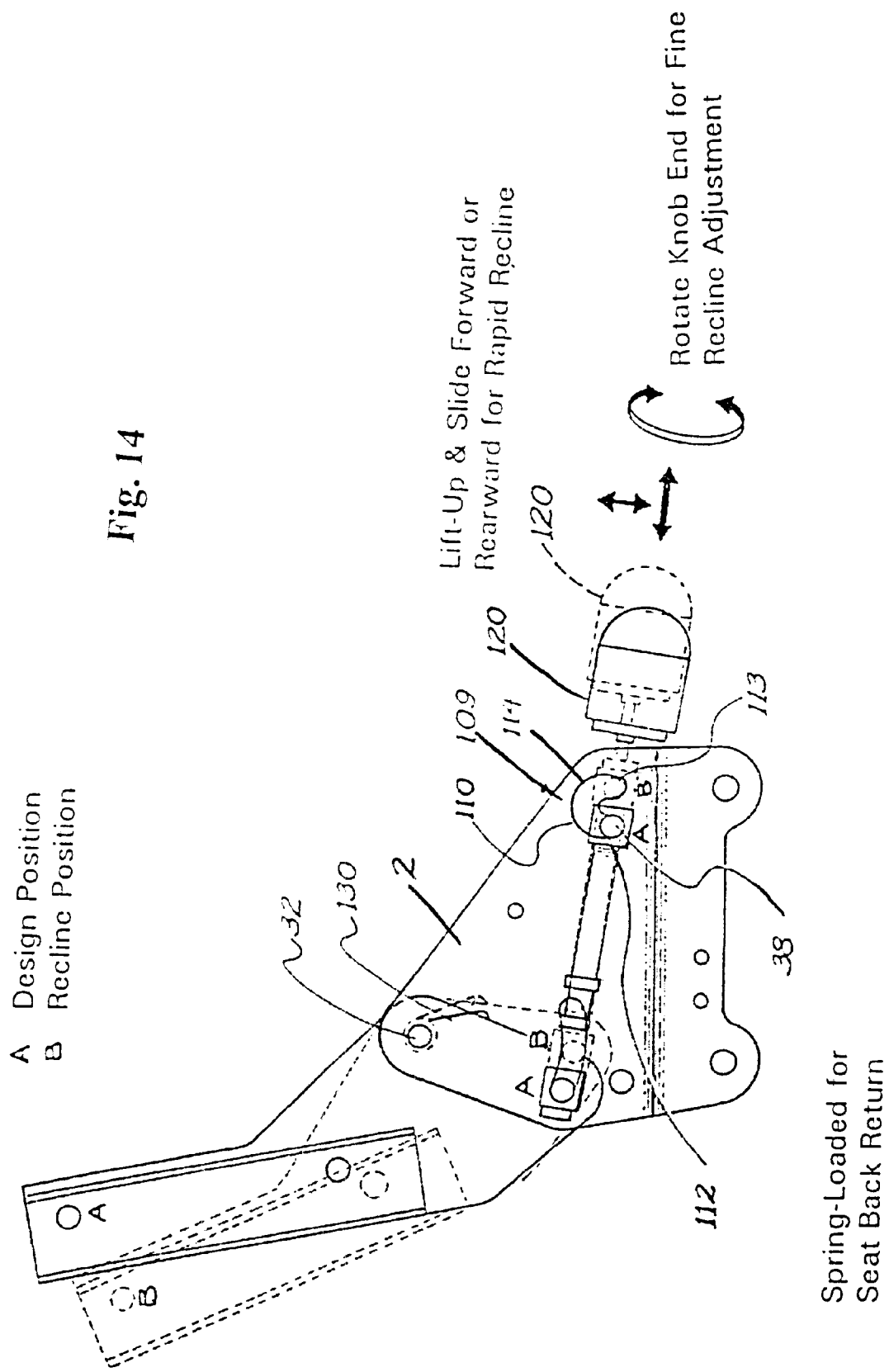

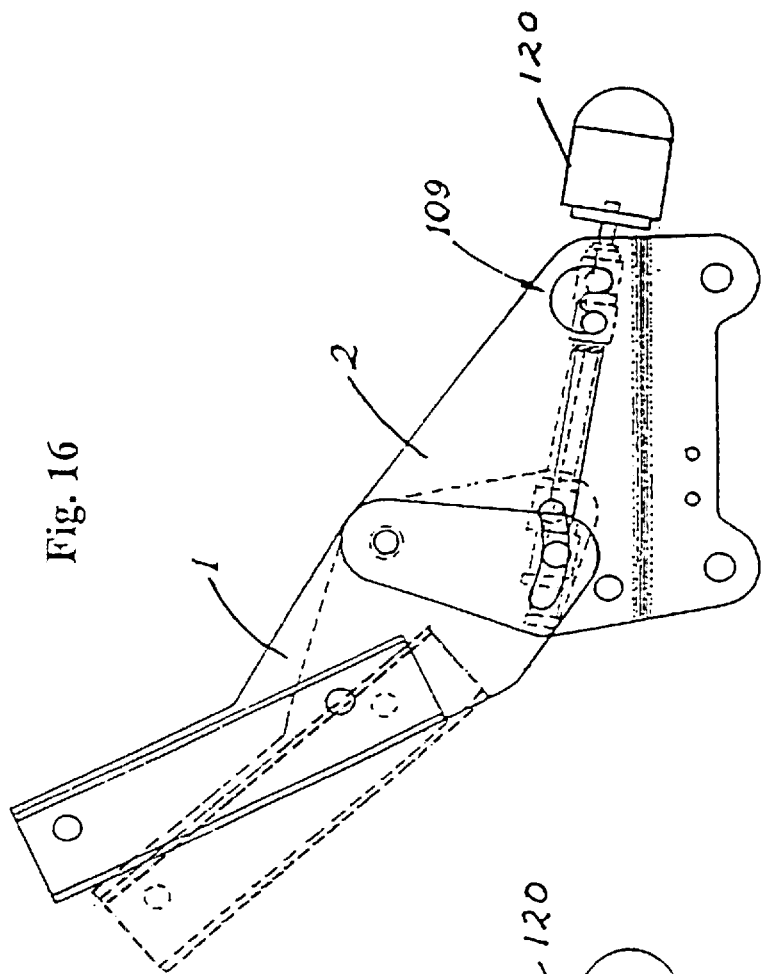
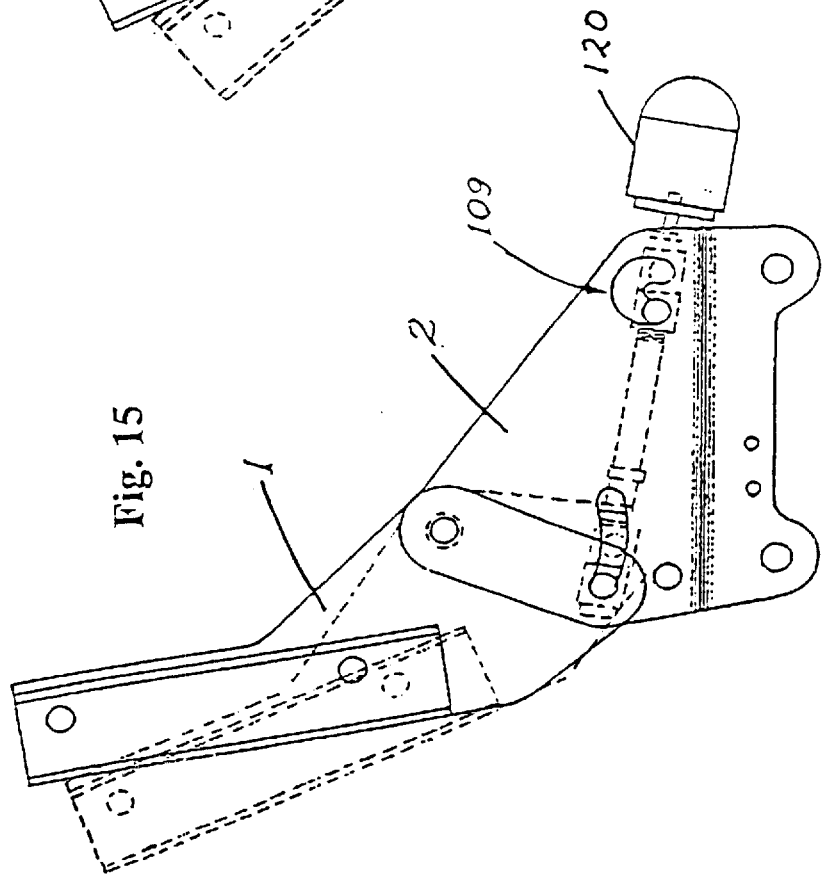
△ 15° Quick Recline
△ 30° Maximum Recline
10° to 40° Limits
Fig. 16
Fig. 15

QUICK ADJUSTMENT RESTRAINT SAFETY SEAT LEAD SCREW SEAT BACK RECLINER

CROSS-REFERENCES TO RELATED APPLICATIONS

This application is based on and claims the benefit of the filing date of Applicant's Provisional Application Ser. No. 60/217,933, filed Jul. 13, 2000.

BACKGROUND OF THE INVENTION

Current seat recliners commonly rely upon a limited choice of mechanisms for seat back angle adjustment. One common mechanism uses a pawl engaging a toothed rack, for example. Another common mechanism uses a threaded rod engaging a nut. Further, a clutch member that is positionable along a rod is also common.

The implementations of these devises are typically relatively bulky or expensive, however, especially when in the form of a recliner for a restraint seat. More particularly, a restraint seat has passenger restraint belts fastened or anchored directly to the restraint seat structure, rather than to a vehicle structure. Thus the restraint seat carries the restraint loads, whereas a non-restraint seat does not. This in turn demands a stronger structure in the restraint seat, including each of its components.

Applicant's prior U.S. Pat. No. 5,597,205 (which is incorporated by reference) discloses an energy absorbing restraint seat back recliner that provides a screw driven high strength recliner mechanism that provides an infinite position adjustment in a high strength construction that is appropriate for a single-sided or dual-sided application in a restraint seat. The drawback with a screw driven mechanism, however, is that the recline can be slow.

An object of the present invention is to provide a cost effective quick adjustment mechanism for a screw drive recliner that is strong enough for single-sided restraint seat applications.

BRIEF SUMMARY OF THE INVENTION

The present invention comprises a quick adjustment mechanism for a lead screw operated seat back recliner that is appropriate for use in a restraint safety seat where the seat belt is mounted to the seat. In the automotive seat safety restraint recliner of the present invention, upper and lower body members are connected respectively to back frame and seat frame portions of the seat and are pivotally connected together to vary the inclination of the back frame with respect to the seat frame. The movement of the body members is accomplished by a rotation mechanism that operates a screw drive mechanism having axially spaced fixed and traveling pinions mounted on a lead screw. The fixed pinion is mounted to one body member and the traveling pinion is mounted to the other body member, such that rotation of the lead screw causes relative axial movement of the pinions that in turn produces a change in seat back inclination. The improvement of the present invention comprises a quick adjustment mechanism wherein one of the pinions, desirably the fixed pinion, is mounted in a multiple position quick adjustment slot in the body member. The pinion has a laterally extending mounting pin that engages the slot. The slot has a plurality of spaced transverse portions that extend transversely to the axial direction of the screw and the axial direction of the mounting pin. The pin fits in each transverse portion, each transverse portion having a transverse edge that engages the pin and resists movement of the pin in the body member when an axial force is placed on the pin by the lead screw. The transverse portions are spaced such that the back frame is at a different inclination when the pin is in each transverse portion. The transverse portions are connected by an offset quick adjustment channel of the slot such that the pin can be moved from one transverse portion to another by moving the pin into the quick adjustment channel and then into another transverse channel. The seat is capable of further inclination adjustment by rotation of the lead screw while the pin is in any of the transverse portions of the slot.

Desirably, the quick adjustment slot comprises a downwardly facing U-shaped slot wherein legs of the slot comprise the transverse portions of the slot and the portion connecting the legs of the slot comprises the quick adjustment channel. The distal or outermost leg of the slot extends down and around the solid center portion between the legs of the slot such that the pinion pin nests securely at the bottom of the leg when an axial stress is placed on the lead screw.

The rotation means for rotating the lead screw can be manual or motorized and is mounted to the lead screw for movement therewith as the lead screw is moved to reposition the pinion pin in different transverse portions of the quick adjustment slot.

The multiple position guide slot of the quick adjustment mechanism is desirably at the front of the recliner body. This front guide slot works with a forward pivot block and provides a quick recline selection independent of the fine recliner adjustment discussed above. The quick recliner does not compromise collision safety, however. Rather, collision integrity is maintained because the two position guide slot resists impact movement and limits travel in the same manner as discussed above regarding the fine recline adjustment safety slot in the lower recliner body.

These and other features, objects, and benefits of the invention will be recognized by one having ordinary skill in the art and by those who practice the invention, from the specification, the claims, and the drawing figures.

BRIEF DESCRIPTION OF THE SEVERAL VIEWS OF THE DRAWING

FIG. 1 is a fragmentary side elevational view of a four-door style recliner assembly of the invention;

FIG. 2 is a cross-sectional view thereof, taken along line II—II of FIG. 1;

FIG. 3 is a cross-sectional view thereof, taken along line III—III of FIG. 1; FIG. 5 is a side elevational view of a first alternative two-door style recliner assembly embodiment of the invention;

FIG. 6 is an end elevational view thereof; and

FIG. 7 is a fragmentary side elevational view thereof, showing slot deformation during overt-travel caused by impact; and FIG. 8 is a side elevational view of a second alternative four-door style recliner assembly embodiment of the invention with an internal right angle drive gear set and energy absorbing housing slot feature; and FIG. 9 is an end elevational view thereof; and FIG. 10 is an enlarged fragmentary detail of the view of FIG. 8, showing a modification thereof in a third alternative embodiment of the invention.

FIG. 14 is a schematic side elevational view showing the operation of the quick and fine adjustment mechanisms of the present invention.

FIGS. 15 and 16 are views similar to FIG. 14, showing the range of motion available with the quick and fine adjustment mechanisms of the present invention.

DETAILED DESCRIPTION OF THE INVENTION

Figure 4:
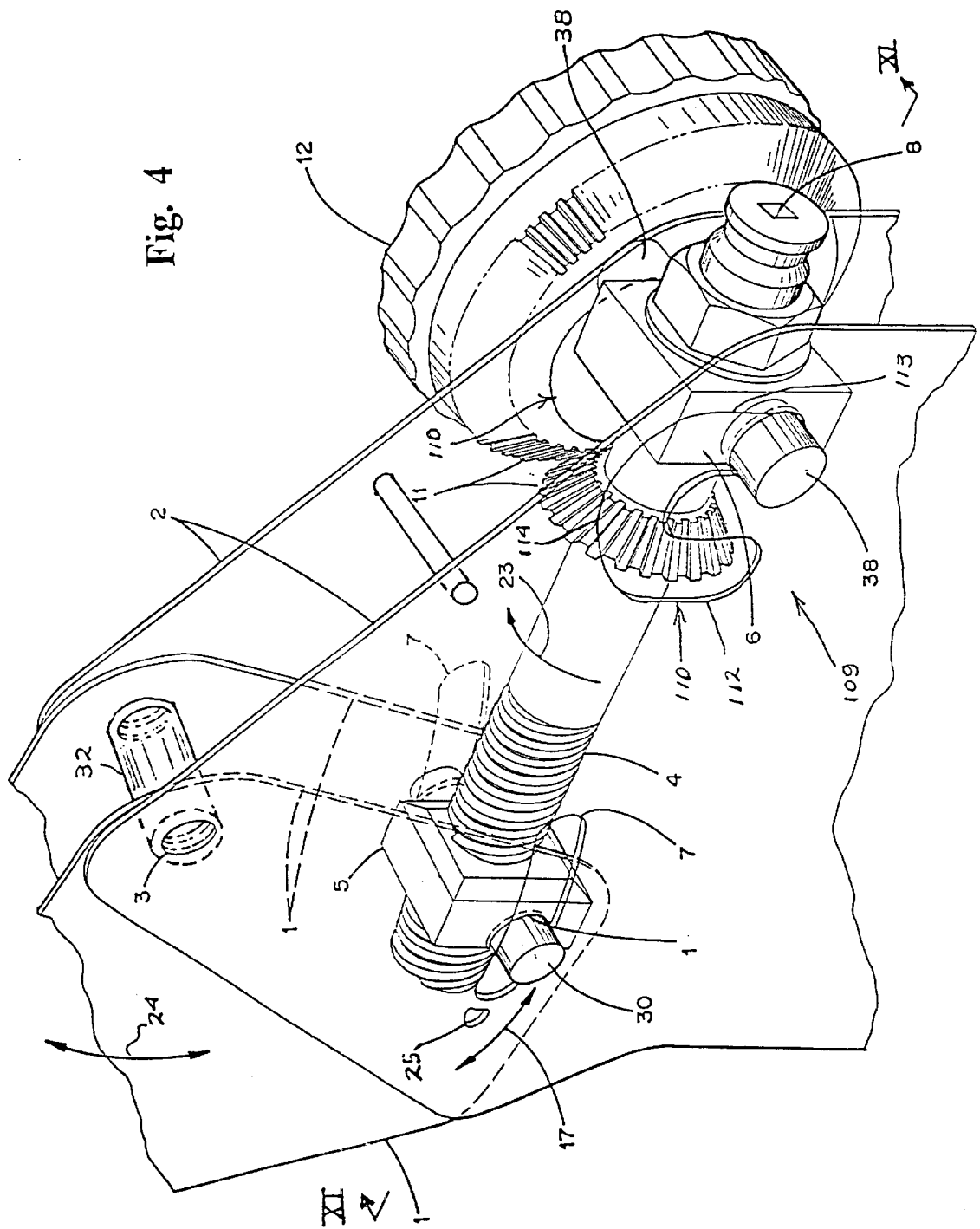
FIG. 4 is a fragmentary perspective view thereof.
Figure 13:
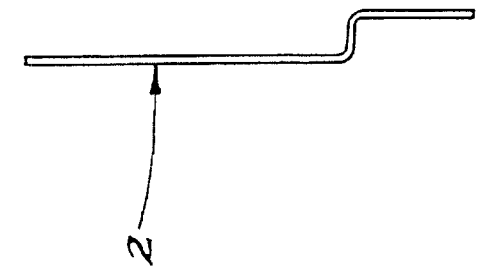
FIG. 13 is an edge view of the lower body portion of FIG. 11.

A first embodiment of a quick adjustment restraint safety seat lead screw seat back recliner of the invention is generally shown in the drawing FIGS. 1–4. The recliner has an upper recliner body 1 that is attached to an upper seat back 14 at fastener openings 15. The upper recliner body 1 is also attached to a lower recliner body 2 by a pivot shaft 32 at the common pivot hole 3. A lead screw 4 is attached to the upper body through the drive nut traveling pinion 5, which has pins 30 extending from opposing sides thereof. The pins 30 travel in guide slots 7 in the lower body 2. A forward end of the lead screw 4 is rotatably connected with a forward pivot block 6. The pivot block 6 is pivot mounted to the lower body 2. The traveling pinion 5 is also pivot mounted to the upper body 1. The lead screw 4 may be rotated by a drive cable 9 and remote motor 10, causing the pinion nut 5 to travel axially along the lead screw length and along the path of the slot to move the upper body relative to the lower body and thereby creating rotation (reclining) of the seat back 14 around the pivot shaft 32.

Also shown in FIGS. 1 and 2 is the option of a manual recliner where the same or similar lead screw mechanism is driven by a hand wheel 12 that turns a bevel gear 11 that is mounted on the lead screw 4 so as to rotate the lead screw.

The upper body comprises a hollow, closed section beam that increases in cross-sectional area as the body extends downward to a position approaching the lower end of the body, where the bending moment is greatest.

The lower body 2 is attached to the seat track 13 by sleeved attachment holes 16 to improve structure. The seat track is mounted to the vehicle structure by a floor-mounted pedestal or the like.

During a frontal vehicle crash, the seat back upper shoulder belt bending moment load vector 18 is reacted at a vector 19 through the pins 30 of the moving pinion 5. The thread of lead screw 4 prevents axial movement of nut pinion 5 and transfers the load to the forward pivot block 6 and through the lower recliner body directly to the seat tracks.

The end view of the recliner in FIG. 3 shows the relative in-line center axis of the recliner, seat track, and back structure to provide an efficient structural system with minimum eccentric loading and minimum mass.

A partial perspective view of the restraint load carrying recliner is shown in FIG. 4. The mechanism is packaged in between spaced plates defining the upper 1 and lower body 2 housings. The upper and lower body both have a pivot hole 3 through which the pivot shaft 32 extends to connect the two bodies and create a pivot location for the recliner. The lower body has a slot 7 for the traveling pinion guide and the upper body has a round hole 10 for the pin mounted to the traveling pinion 5, such that movement of the traveling pinion nut 5 creates rotation (reclining) of the upper body relative to the lower body.

The traveling pinion nut 5 is moved linearly or axially by rotation of the lead screw 4 that is threaded for part of its length. The smooth shaft portion of the lead screw rotates in the forward pivot block 6 that is connected by pin 38 to a quick adjustment guide slot 110 in the lower body 2. This is described in more detail below.

A drive shaft connection 8 with appropriate keyed end is employed to connect a drive cable and turned either by a remote motor or a manual handle wheel 12.

Arrow 17 (FIG. 4) represents near linear movement of the travel pinion nut 5 along the lead screw 4 and arrow 23 represents rotational movement of the screw 4 and upper body 1 respectively. The design end slot 7 has unique lance opening taper slot 25 designed to deform at crash threshold levels and provide additional controlled travel and energy absorption of the occupant by virtue of a restraint seat loading the recliner end slot.

A two door vehicle recliner 40 is shown in FIGS. 5–7, which represent a scaled side view, an end view, and a partial side view of the mechanism after crash load displacement.

Similar to FIG. 1, the upper body 41 is connected to the die cast magnesium lower body 42 at the recliner pivot 43. Intermediate double plates 57, also pivotally mounted on pivot 43, are positioned between upper body 41 and lower body 42. Intermediate double plates 57 are attached to each side of the traveling pinion nut of the screw drive mechanism in the same manner as the traveling pinion nut is attached to the upper body of FIG. 1. A metal double hook 54 is employed to selectively block pivotal movement of upper body 41 with respect to intermediate plates 57. A lead screw 44 has a moving pinion traveling nut 45 at one end and a stationary pinion 46 at the other end. The moving pinion 45 rides in a guide slot 47 in the lower body and the end of the guide slot has a unique stop tap 48 and tapping end to resist pinion movement at a controlled collapse rate.

While die cast magnesium is a preferred construction of the lower body in all embodiments, the lower body as well as the upper body also could be formed of other high strength material such as Martensitic steel, high strength steel, or aluminum. A composite plastic also could be employed. The lead screw mechanism is preferably case hardened.

A press-on bushing 49 is preferably located next to the lead screw 44 shaft to resist pinion shaft movement. However, the bushing 49 may be designed to break loose from the shaft and slide at a threshold crash load such as 10,000 pounds axially. The lead screw shaft, which is smooth at this end, will slide through the stationary pinion 46, resisted by slot end 48, and crushable sleeve member 50 thereby permitting forward displacement of the recliner, seat back, and occupant shoulder belt at a controlled rate to absorb occupant impact energy. The displaced lead screw 44, pinion 45, crushed sleeve 50 and displacement 58 of the shaft assembly end points under a vehicle crash load are shown in FIG. 7.

A nut 51 is at the end of the lead screw shaft to limit shaft travel, and a key 52 is at the shaft end center used to drive and rotate the lead screw to create normal recliner movement.

A metal double hook 54 is utilized to latch to the intermediate double plate 57. They are connected with a circular return spring 61 mounted around pivot axis 63. Occupant release of hook 54 allows dumping of the recliner upper body forward. An inertia latch consisting of a pivoting metal bar 59 having a weighted lower end pinned to the lower body and a set of metal teeth 58 spaced around the pivot axis of the upper body. In the event of a forward designated g-level, such as three g's (deceleration three times the force of gravity), the weighted lower end of bar 59 will swing forward as shown by arrow 60 to engage teeth 68 and lock-up and or resist forward recliner rotation. Therefore the inertia latch serves as a secondary recliner safety lock. Bar 59 will swing back to unlock position at normal one g gravity. Item 53 is the seat track, shown for reference.

FIGS. 8 and 9 show a side view and end view of a four door metal fabricated recliner 70 with an internal lead screw 74 and traveling nut pinion 75 pinned to the upper body 71 and riding in a slot 77 in the lower body 72.

A right angle gear set is contained in housing 81 and pin-mounted to the lower body at 76. An extension drive shaft 80 exits the lower body through a round hole with a unique end slot treatment 79, which is similar to the energy absorbing end slot 78 at the traveling nut pinion. When a forward occupant upper shoulder belt load is applied, as shown by arrow 84 on the recliner body, it is reacted by the traveling nut pinion 75, as shown by arrow 85. The nut transfers the load to pivot mounting end of the lead screw mechanism at 76 and is resisted as shown by arrow 87.

At a prescribed threshold force level, pinion mount 76 can elongate or fracture causing the lead screw to displace in the direction of arrow 85. This displacement is resisted by narrowing end slots 78 and 79 against the pinion and right angle drive shaft respectively. The continued displacement along the slot at a designated resistance force generate energy absorption and promotes occupant torso safe deceleration.

Similar to other figures, a drive key shaft 82 is at the end of extension drive shaft 80. The upper recliner body is mounted to the seat back at fastener openings 95, and lower recliner body is mounted to the seat track fastener openings at 96. Stand-off rivets 93 are utilized in the construction of the double wall recliner bodies to join the wall and help create an improved structure.

A displaced partial side view of an alternative mechanism is shown in FIG. 10, with the, same mechanism components having the same numbers as in FIGS. 8 and 9; i.e., energy absorber end slots 78, a front pivot mount 76 for the mechanism assembly, and guide slot 77. New is a split lead screw 104 having an energy absorbing elongation sleeve 90 shown crimped over the split ends of the lead screw, such that at threshold axial force levels, the sleeve will elongate by virtue of its hump-back design, thereby causing controlled, limited displacement with additional resistance. Further resistance is created at gear housing mounting end slot 108.

An important feature of the present invention that can be employed in all embodiments is the quick adjustment recliner mechanism 109 shown particularly in FIGS. 4 and 11–17. The quick adjustment mechanism comprises a multiple position quick adjustment slot 110 for quickly adjusting the inclination of the seat back without rotating the lead screw. Quick adjustment slot 110 is formed in each of the spaced plates constituting lower body 2, if two plates are used. The quick adjustment slot comprises a pair of axially spaced transverse portions 112 and 113 and an offset adjustment channel 114 connecting upper ends of the transverse portions 112 and 113. The slot thus has the general shape of a downwardly facing U-shaped slot.

As shown in FIG. 4, pinion pin 38, which extends out opposite sides of travelling pinion nut 5, fits into slot 110 and rests in either leg or transverse portion of the slot. The position of the travelling pinion can be quickly adjusted by lifting the travelling pinion upwardly into the connecting channel (the lead screw being pivoted about pin 30) and then inserting the pin downwardly in the other leg of the slot. Since the legs are spaced axially with respect to the lead screw, the movement of the fixed pinion from one leg to the other has the effect of a quick adjustment in the inclination of the seat back. In the preferred practice of the invention, the quick adjustment slot is a U-shaped slot as shown, and this has the effect of adjusting inclination by 15 degrees. The fine adjustment provided by the rotation of the lead screw provides for another adjustment 15 degrees.

Figure 12:
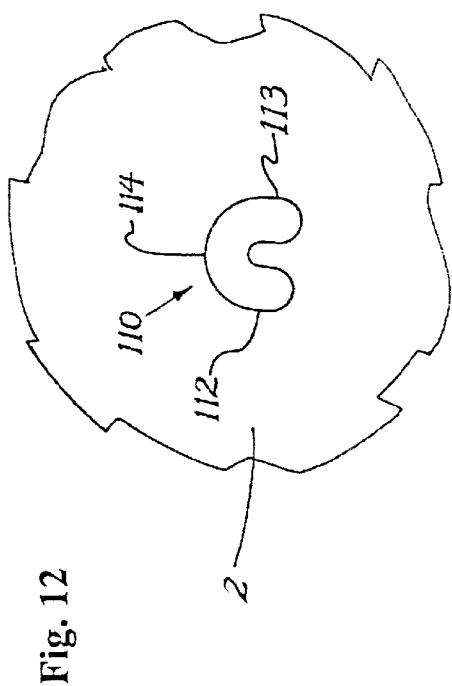
FIG. 12 is an exploded view of the quick adjustment slot of the present invention.
Figure 11:
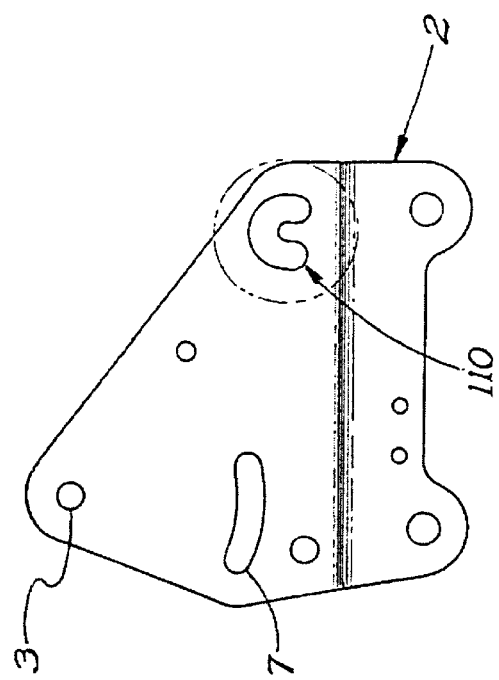
FIG. 11 is a side elevational view of the lower recliner body, taken along line XI—XI of FIG. 1.

As shown in FIGS. 11 and 12, leg 113 of the quick adjustment slot extends downwardly in an arcuate path a little further than leg 112. This causes pin 38 to nest more securely in the bottom of leg 113 when an axial stress is placed on the lead screw by the sudden stopping of a vehicle. This insures that the fixed pinion stays in leg 113 of the slot during an emergency stop.

While a U-shaped quick adjustment slot having two legs or transverse portions is shown in the drawings, it is possible that a multiple position slot having more than two legs could be employed.

While the side mounted manual adjustment wheel 12 shown in FIG. 4 can be employed with the quick adjustment slot of the present invention, a knob 120 mounted on the end of the lead screw can also be employed, as shown in FIGS. 14–16. The knob can be rotated in order to provide fine adjustment of seat back inclination, while rapid recline can be achieved by simply pulling upward on the knob to move the pin 30 of the fixed pinion from one leg of the quick adjustment slot to the other. The seat back is desirably spring loaded toward an upright position. A spring 130 is shown schematically, but any conventional spring return mechanism will work.

Quick adjustment mechanism provided by the two-position quick adjustment front guide slot is a new feature and is desirably used in conjunction with the rear guide slot mechanism as shown. The two-position guide slot is a safety feature that limits occupant seat back travel during a vehicle collision. The unique two position slot permits the features of quick seat back positioning from normal driver to recline position. The design of the forward slot in conjunction with the rear slot in the housing limits the back travel. The guide slot will not permit seat back forward movement. This is an important safety feature for an SIR (seat integrated restraint) seat where the shoulder belt is attached to the seat back. The lead screw provides a constant engagement, always locked recliner, with infinite seat back adjustment, but has the disadvantage of slow recline. The second position of the screw pinion overcomes this disadvantage without disengaging the lead screw and maintains a locked safety recliner. The normal stationary pinion has two manual positions but more can be employed.

The use of a hand knob to rotate the lead screw provides a low cost, restraint recliner. The manual hand knob can be replaced with a power motor and cable drive which is the more convenient, and a more expensive system. The two or multi-position screw has utility for a manual system for passenger seats where a sleeper recliner position is desirable. The hand knob can be mounted directly in line with the screw for a minimum cost mechanism or at right angles to the screw through a gear set. This approach to restraint seat back recliner mechanism provides a low cost safety solution restraint recliner with improved ease for occupant operation.

This recliner will permit use of a manual SIR seat and encourage occupant use of the seat belt by virtue of its inherent improved convenience and occupant safety.

It will be understood by one having ordinary skill in the art and by those who practice the invention, that various modifications and improvements may be made without departing from the spirit of the disclosed concept. Various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

What is claimed is:

1. In an automotive seat safety restraint recliner wherein upper and lower body members are connected respectively to back frame and seat frame portions of the seat and are pivotally connected together to vary the inclination of the back frame with respect to the seat frame, the movement of the body members being accomplished by a rotation means that operates a screw drive mechanism having axially spaced fixed and traveling pinions mounted on a lead screw, with the fixed pinion being mounted to one body member and the traveling pinion being mounted to the other body member, such that rotation of the lead screw causes relative axial movement of the pinions that in turn produces a change in seat back inclination, the improvement comprising a quick adjustment mechanism wherein one of the pinions is mounted in a multiple position quick adjustment slot in the body member, the pinion having a laterally extending mounting pin that engages the slot, the slot having a plurality of spaced transverse portions that extend transversely to the axial direction of the screw and the axial direction of the mounting pin, the pin fitting in each transverse portion, each transverse portion having a transverse edge that engages the pin and resists movement of the pin in the body member when an axial force is placed on the pin by the lead screw, the transverse portions being spaced such that the back frame is at a different inclination when the pin is in each transverse portion, the transverse portions being connected by an offset quick adjustment channel of the slot such that the pin can be moved from one transverse portion to another by moving the pin into the quick adjustment channel and then into another transverse channel, the seat being capable of further inclination adjustment by rotation of the lead screw while the pin is in any of the transverse portions of the slot.

2. An automotive seat safety recliner as in claim 1 wherein the body member housing the quick adjustment mechanism comprises a pair of spaced plates positioned on opposite sides of the pinion, the pinion mounting pin comprising coaxial pins extending from opposite sides of the pinion, the quick adjustment mechanism including quick adjustment slots in each plate that receive the pins therein.

3. An automotive seat safety recliner as in claim 1 wherein the quick adjustment slot comprises a U-shaped slot wherein legs of the slot comprise the transverse portions of the slot and the portion connecting the legs of the slot comprising the quick adjustment channel.

4. An automotive seat safety recliner as in claim 3 wherein the U-shaped slot faces downwardly, the pinion and lead screw being moveable upwardly to change the position of the pinion pins from one leg of the slot to another leg.

5. An automotive seat safety recliner as in claim 1 wherein the rotation means for rotating the lead screw is mounted to the lead screw for movement therewith as the lead screw is moved to reposition the pinion pin in different transverse portions of the quick adjustment slot.

6. An automotive seat safety recliner as in claim 5 wherein the rotation means comprises a manually operable handle.

7. An automotive seat safety recliner as in claim 6 wherein the manually operable handle is mounted on an end of the lead screw adjacent the pinion that engages the quick adjustment slot.

8. An automotive seat safety recliner as in claim 5 wherein the rotation means comprises a motor drive mechanism.

* * * * *